US009618707B2

(12) United States Patent
Leyva, Jr. et al.

(10) Patent No.: US 9,618,707 B2
(45) Date of Patent: Apr. 11, 2017

(54) FIBER OPTIC CONNECTOR INSTALLATION TOOL

(71) Applicant: Corning Optical Communications LLC, Hickory, NC (US)

(72) Inventors: Daniel Leyva, Jr., Arlington, TX (US); Joshua Douglas Raker, Lewisville, TX (US)

(73) Assignee: Corning Optical Communications LLC, Hickory, NC (US)

( * ) Notice: Subject to any disclaimer, the term of this patent is extended or adjusted under 35 U.S.C. 154(b) by 26 days.

(21) Appl. No.: 14/445,716

(22) Filed: Jul. 29, 2014

(65) Prior Publication Data

US 2015/0063757 A1    Mar. 5, 2015

Related U.S. Application Data

(60) Provisional application No. 61/871,396, filed on Aug. 29, 2013, provisional application No. 61/871,558, filed on Aug. 29, 2013.

(51) Int. Cl.
| | |
|---|---|
| *G02B 6/36* | (2006.01) |
| *G02B 6/00* | (2006.01) |
| *G02B 6/38* | (2006.01) |
| *G01M 11/00* | (2006.01) |

(52) U.S. Cl.
CPC ........... *G02B 6/3898* (2013.01); *G01M 11/30* (2013.01); *G02B 6/3802* (2013.01); *G02B 6/385* (2013.01); *G02B 6/3826* (2013.01); *G02B 6/3846* (2013.01); *G02B 6/3806* (2013.01); *G02B 6/3833* (2013.01); *G02B 6/3843* (2013.01)

(58) Field of Classification Search
CPC .... G02B 6/4454; G02B 6/3869; G02B 6/385; G02B 6/3846; G02B 6/3898; G02B 6/3802

USPC ............... 385/76, 78, 87, 134, 135
See application file for complete search history.

(56) References Cited

U.S. PATENT DOCUMENTS

| | | | | |
|---|---|---|---|---|
| 7,680,384 | B2 | 3/2010 | Billman et al. | 385/134 |
| 8,094,988 | B2 | 1/2012 | Billman et al. | 385/134 |
| 2007/0172179 | A1 | 7/2007 | Billman et al. | 385/99 |
| 2007/0217745 | A1* | 9/2007 | Semmler | G02B 6/3801 385/53 |
| 2010/0129044 | A1 | 5/2010 | Wagner et al. | 385/139 |

(Continued)

FOREIGN PATENT DOCUMENTS

| | | | | |
|---|---|---|---|---|
| EP | 2624032 A1 | 8/2013 | | G02B 6/38 |
| KR | 2008033179 A | 4/2008 | | H04B 1/38 |

OTHER PUBLICATIONS

Patent Cooperation Treaty International Search Report, Application No. PCT/U52014/052445, Nov. 5, 2014, 3 pages.

*Primary Examiner* — Kaveh C Kianni
*Assistant Examiner* — Hung Lam (57) ABSTRACT

An installation tool for terminating one or more field optical fibers with a fiber optic connector includes a guide member and camming member. The guide member has a slot extending in an axial direction and is configured to receive a portion of the fiber optic connector. The camming member is positioned next to the guide member and is movable between a first position spaced from the slot and a second position axially aligned with the slot. Additionally, the camming member is configured to engage and actuate a cam member of the fiber optic connector by moving from the first position to the second position when the fiber optic connector is received in the slot.

18 Claims, 9 Drawing Sheets

(56) References Cited

U.S. PATENT DOCUMENTS

| | | | |
|---|---|---|---|
| 2010/0142905 A1* | 6/2010 | Billman | G01M 11/33 385/134 |
| 2012/0180298 A1 | 7/2012 | Castonguay et al. | |
| 2013/0195416 A1* | 8/2013 | Jones | G02B 6/3803 385/135 |
| 2013/0265794 A1* | 10/2013 | Flatt | G02B 6/3802 362/551 |
| 2015/0063761 A1 | 3/2015 | Hallett et al. | |

* cited by examiner

FIBER OPTIC CONNECTOR INSTALLATION TOOL

CROSS-REFERENCE TO RELATED APPLICATIONS

This application claims the benefit of priority under 35 U.S.C. §119 of U.S. Provisional Application Ser. Nos. 61/871,396 and 61/871,558, both of which were filed on Aug. 29, 2013, and both of whose content is relied upon and incorporated herein by reference in its entirety.

BACKGROUND

The disclosure relates generally to installation tools and methods for terminating one or more optical fibers with a fiber optic connector, and more particularly to such installation tools and methods having a camming member for actuating a portion of the fiber optic connector to secure the fiber optic connector to the one or more optical fibers.

Optical fibers are useful in a wide variety of applications, including the telecommunications industry for voice, video, and data transmission. Due at least in part to the extremely wide bandwidth and the low noise operation provided by optical fibers, the variety of applications in which optical fibers are being used is continuing to increase. For example, optical fibers no longer serve merely as a medium for long distance signal transmission, but are being increasingly routed directly to the home and, in some instances, directly to a desk or other work location.

In a system that uses optical fibers, there are typically many locations where one or more optical fibers need to be optically coupled to one or more other optical fibers. The optical coupling is often achieved by fusion splicing the optical fibers together or by terminating the optical fibers with fiber optic connectors. Fusion splicing has the advantage of providing low attenuation, but can make reconfiguring the system difficult, typically requires expensive tools to perform the operation, and involves additional hardware to protect the spliced area after the operation. Termination, on the other hand, provides the flexibility to reconfigure a system by allowing optical fibers to be quickly connected to and disconnected from other optical fibers or equipment.

One challenge associated with termination is making sure that the fiber optic connectors do not significantly attenuate, reflect, or otherwise alter the optical signals being transmitted. Performing termination in a factory setting ("factory termination") is one way to address this challenge. The availability of advanced equipment and a controlled environment allow connectors to be installed on the end portions of optical fibers in an efficient and reliable manner. In many instances, however, factory termination is not possible or practical. For example, the lengths of fiber optic cable needed for a system may not be known before installation. Terminating the cables in the field ("field termination") provides on-site flexibility both during initial installation and during any reconfiguring of the system, thereby optimizing cable management. Because field termination is more user-dependent, fiber optic connectors have been developed to facilitate the process and help control installation quality.

Figure 1A:
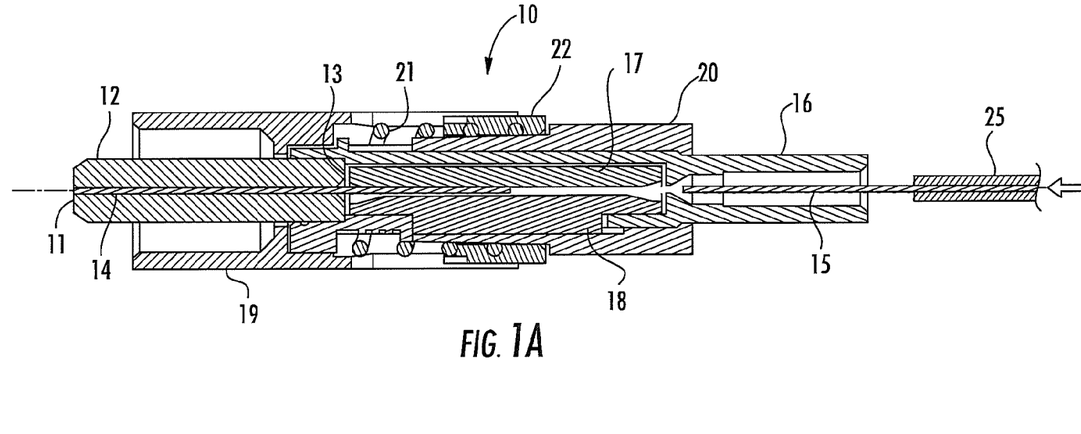
FIG. 1A is a lengthwise cross-sectional view of one example of a field-installable mechanical splice connector being mounted on a field optical fiber by inserting the field optical fiber through a rear end of the mechanical splice connector.
Figure 1B:
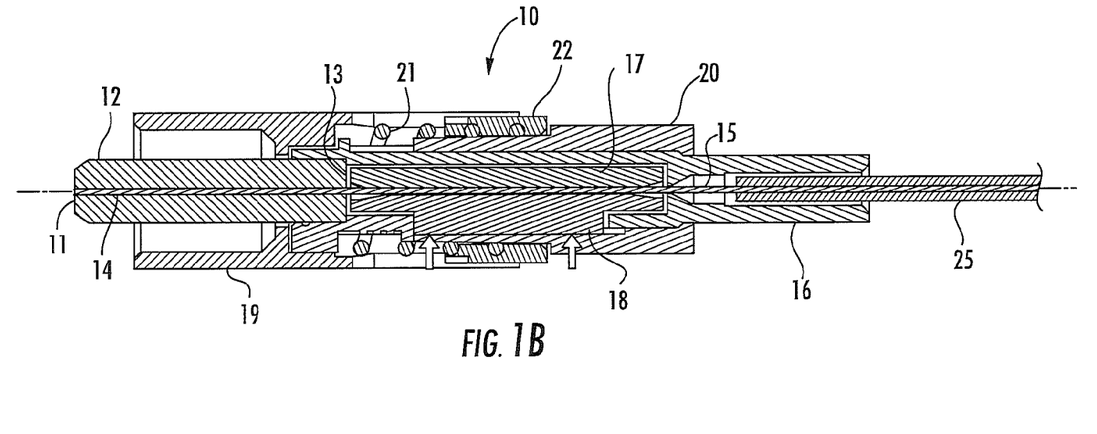
FIG. 1B is a lengthwise cross-sectional view similar to FIG. 1A, but showing the field optical fiber mechanically spliced to a stub optical fiber within the mechanical splice connector by means of splice components that have been moved to an actuated position by a cam member.

One example of such a development is the UNICAM® family of field-installable fiber optic connectors available from Corning Cable Systems LLC of Hickory, N.C. UNICAM® fiber optic connectors include a number of common features, such as a mechanical splice between a preterminated fiber stub ("stub optical fiber") and an optical fiber from the field ("field optical fiber"), and are available in several different styles of connectors, such as ST, SC, and LC fiber optic connectors. FIGS. 1B and 1B illustrate an exemplary fiber optic connector 10 belonging to the UNICAM® family of fiber optic connectors. A brief overview of the fiber optic connector 10 will be provided for background purposes. It should be noted, however, that the apparatuses and methods disclosed herein may be applicable to other fiber optic connectors that are actuated in some manner to help establish a splice connection with one or more optical fibers.

As shown in FIGS. 1A and 1B, the fiber optic connector 10 includes a ferrule 12 received in a ferrule holder 16, which in turn is received in a connector housing 19. The ferrule 12 defines a lengthwise, longitudinal bore for receiving a stub optical fiber 14. The stub optical fiber 14 may be sized such that one end extends outwardly beyond a rear end 13 of the ferrule 12. The fiber optic connector 10 also includes a pair of opposed splice components 17, 18 within the ferrule holder 16, a cam member 20 received over a portion of the ferrule holder 16 that includes the splice components 17, 18, a spring retainer 22 fixed to the connector housing 19, and a spring 21 for biasing the ferrule holder 16 forwardly relative to the spring retainer 22 and connector housing 19. At least one of the splice components 17, 18 defines a lengthwise, longitudinal groove for receiving and aligning the end portion of the stub optical fiber 14 and an end portion of a field optical fiber 15 upon which the fiber optic connector 10 is to be mounted. An index-matching material (e.g., index-matching gel) may be provided within this groove for reasons mentioned below.

To mount the fiber optic connector 10 on the field optical fiber 15, the splice components 17, 18 are positioned proximate the rear end 13 of the ferrule 12 such that the end portion of the stub optical fiber 14 extending rearwardly from the ferrule 12 is disposed within the groove defined by the splice components 17, 18. Thereafter, the end portion of the field optical fiber 15 can be inserted through a lead-in tube (not shown in FIGS. 1A and 1B) and into the groove defined by the splice components 17, 18. By advancing the field optical fiber 15 into the groove defined by the splice components 17, 18, the end portions of the stub optical fiber 14 and the field optical fiber 15 make physical contact and establish an optical connection or coupling between the field optical fiber 15 and the stub optical fiber 14. The index-matching material (e.g., index-matching gel) provided within the groove surrounds this optical connection to help reduce losses in optical signals that are transmitted between the filed optical fiber 15 and stub optical fiber 14.

The splice termination of the fiber optic connector 10 is completed as illustrated in FIG. 1B by actuating the cam member 20, which engages a keel portion of the lower splice component 18 to bias the splice components 17, 18 together and thereby secure the end portions of the stub optical fiber 14 and the field optical fiber 15 within the groove defined by the splice components 17, 18. This step is typically completed using a specially-designed installation tool. The cable assembly may then be completed, for example, by strain relieving a buffer 25 of the field optical fiber 15 to the fiber optic connector 10 in a known manner.

Figure 2:
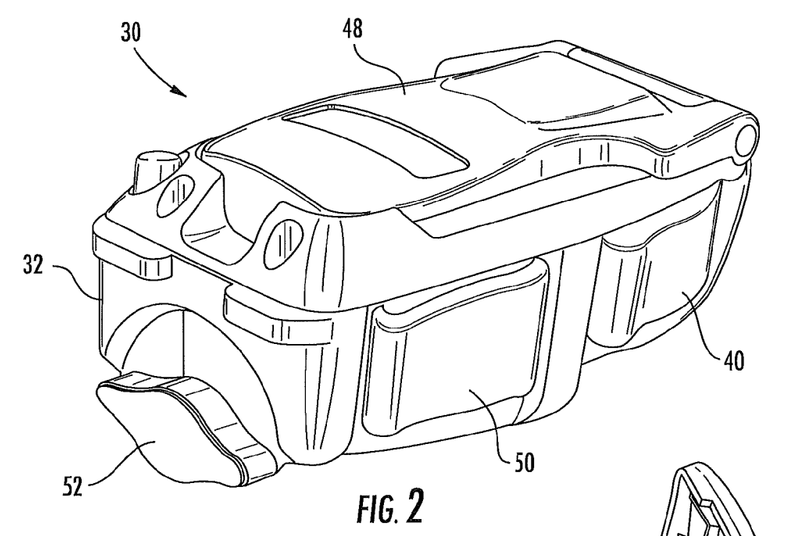
FIG. 2 is a perspective of one example of an installation tool for terminating a field optical fiber with a fiber optic connector, such as the mechanical splice connector of FIGS. 1A and 1B, wherein the installation tool is shown in a closed configuration.
Figure 3:
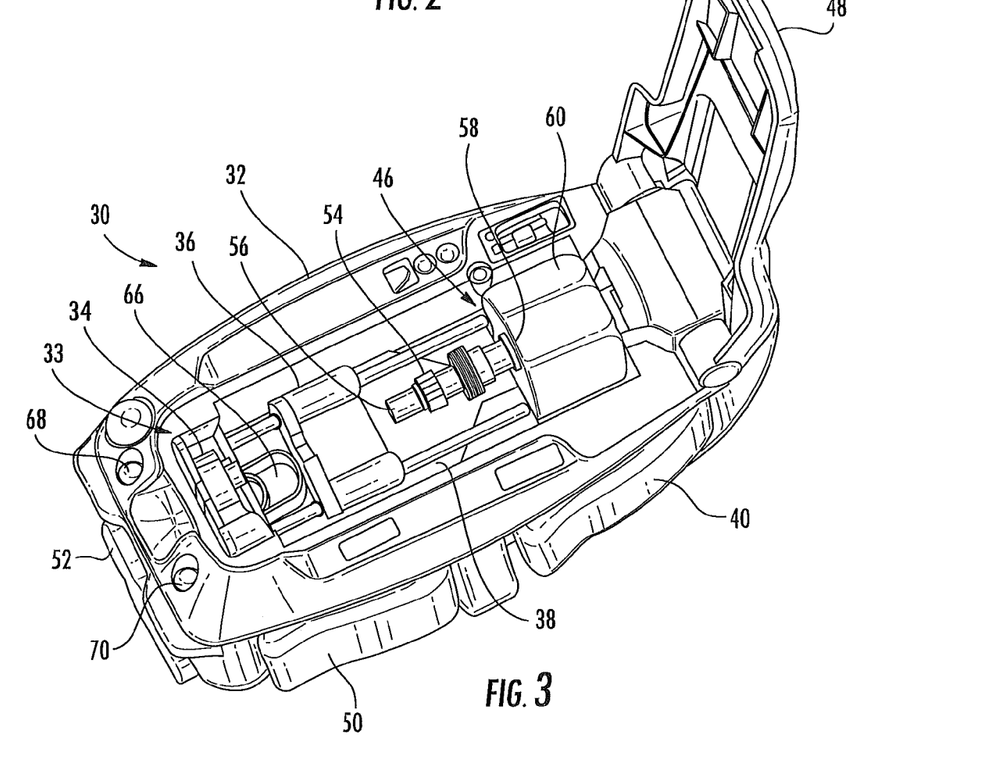
FIG. 3 is a perspective view of the installation tool of FIG. 2 in an open configuration prior to use.
Figure 4:
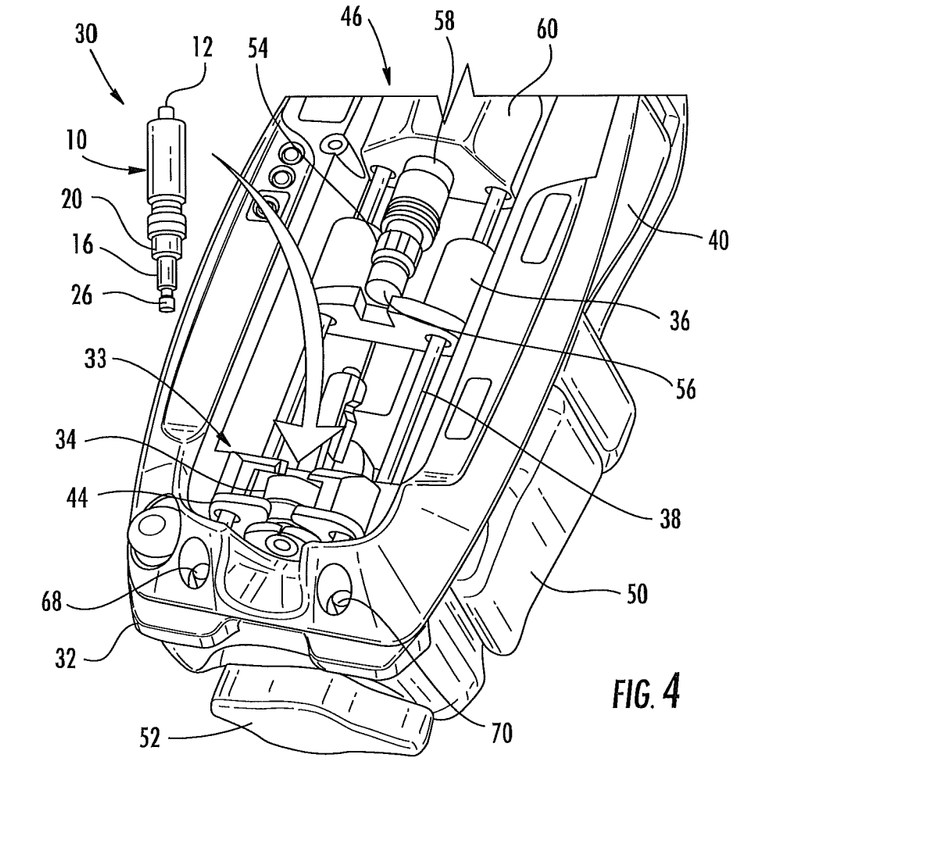
FIG. 4 is a perspective view of the installation tool of FIG. 2 in an open configuration, wherein a fiber optic connector is shown being loaded into the installation tool.

FIGS. 2-4 illustrate an installation tool 30 that is an example of those offered by Corning Cable Systems for mounting the UNICAM® family of fiber optic connectors upon the end portion of a field optical fiber. Similar to the description above for the fiber optic connector 10, a brief overview will be provided for background purposes with the understanding that the systems and methods disclosed later herein are applicable to other types of installation tools. Indeed, as will be apparent, the systems and methods disclosed later herein may be applicable to any installation tool for terminating one or more optical fibers with a fiber optic connector that requires actuation to securely position the one or more field optical fibers in the fiber optic connector.

The installation tool 30 includes a body or housing 32 having an actuation assembly 33 and cradle 36. The cradle 36 is slidable along guide rails 38 inside the body 32 and normally biased toward the actuation assembly 33, as shown in FIG. 3. Prior to inserting a fiber optic connector into the installation tool, the cradle 36 is moved away from the actuation assembly 33. This movement may be achieved by pressing a load button 40, which is operably coupled to the cradle 36 through mechanical linkages (not shown) within the body 32. With the load button 40 depressed (FIG. 4), a user may place a fiber optic connector 10 into the space between the actuation assembly 33 and cradle 36, and subsequently move a lead-in tube 26 of the fiber optic connector 10 axially through a camming member or wrench 34 of the actuation assembly 33 until the cam member 20 is seated in the camming member 34. At this point, the lead-in tube 26 extends beyond crimp arms 44 that are positioned next to the actuation assembly 33. Before inserting a field optical fiber 15 into the lead-in tube 26, the load button 40 is released so that the cradle 36 moves back toward the actuation assembly 33 until the front portion of the fiber optic connector 10 is seated in the cradle 36. A visual fault locator (VFL) assembly 46, the purpose of which will be briefly described below, is also slid toward the fiber optic connector 10 before closing a lid or cover 48 of the installation tool 30 and completing the termination process.

The field optical fiber 15 is eventually inserted into the back of the lead-in tube 26 of the fiber optic connector 10 until it abuts the stub optical fiber 15 (FIGS. 1A and 1B) within the splice components 17, 18. A user then actuates the cam member 20, for example by pressing a cam button 50 operably coupled to the camming member 34 by mechanical linkages (not shown), to bias the splice components 17, 18 together and thereby secure the stub optical fiber 14 and field optical fiber 15 between the splice components 17, 18. At this point the VFL assembly 46 may be used to check the splice connection between the stub optical fiber 14 and field optical fiber 15. The VFL assembly 46 includes an adapter 54, a coupler 60, a jumper (not shown; hidden within the installation tool 30), and an optical power generator (also hidden from view) in the form of a Helium Neon (HeNe) gas laser. The operation of these components is not the focus of this disclosure. Thus, the Corning Cable Systems LLC system/method for verifying an acceptable splice termination, which is commonly referred to as the "Continuity Test System" (CTS), and the combined functionality of the gas laser and jumper, which are commonly referred to as a "Visual Fault Locator" (VFL), will not be further described herein. Reference can instead be made to U.S. Pat. No. 8,094,988, for example, to obtain a more complete understanding of how the installation tool 30 advantageously incorporates continuity testing. Once an acceptable splice termination is verified, the crimp arms 44 are actuated by rotating a crimp knob 52 to secure the lead-in tube 26 onto the field optical fiber 15.

Figure 5A:
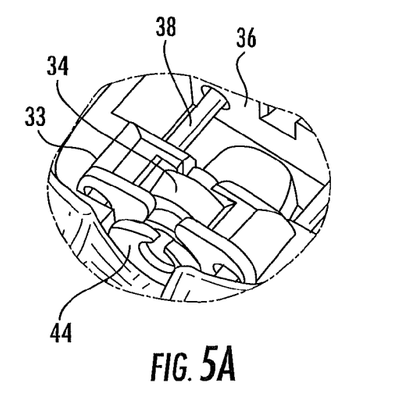
FIGS. 5A and 5B are perspective views of a camming member of the installation tool in an initial/start position and a finished/actuated position.
Figure 5B:
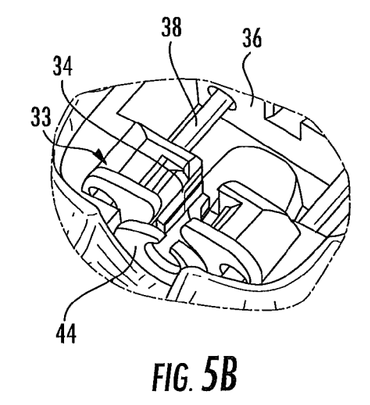

Pressing the cam button 50 to actuate the cam member 20 by means of the camming member 34 moves the camming member 34 from a closed configuration to an open configuration, as shown in FIGS. 5A and 5B. More specifically, the camming member 34 is a spur gear wrench that rotates about the termination axis defined by the stub optical fiber 14 and field optical fiber 15. In a "start" position of the camming member 34 (FIG. 5A), a closed portion of the camming member 34 faces up such that a user must load the fiber optic connector 10 into the camming member in an axial direction from a space between the camming member 34 and cradle 36, as mentioned above. In a "finished" or actuated position of the camming member 34 (FIG. 5B), an open portion of the camming member 34 faces up to allow for easy removal of the fiber optic connector 10 and field optical fiber 15. After moving the VFL assembly 46 back away from the fiber optic connector 10 and then pressing the load button 40, a user can simply grab the fiber optic connector 10 and lift straight up (i.e., away from the body 32).

The movement of the camming member 34 between open and closed positions presents some challenges. In particular, loading the fiber optic connector 10 into the camming member 34 may not be intuitive because of the closed configuration a user sees. Moreover, even if the process for loading the fiber optic connector 10 is known or appreciated, positioning the fiber optic connector 10 between the camming member 34 and VFL assembly 46 and then subsequently moving the fiber optic connector 10 axially into the camming member 34 requires concentration because the opening of the camming member 34 is generally obstructed from view. The space constraints of the installation tool 30 also have the potential to present challenges. These and other factors have the potential to result in the fiber optic connector 10 being loaded into the installation incorrectly, which in turn has the potential to permanently damage the fiber optic connector 10 during the termination process. Therefore, a need exists for installation tools that address these challenges.

SUMMARY

This disclosure includes different embodiments of installation tools for terminating one or more field optical fibers with a fiber optic connector. The installation tools may be for use with fiber optic connectors that include a stub optical fiber extending from a ferrule into one or more splice components, which in turn are surrounded by a cam member. In some embodiments, such installation tools include a body configured to support the fiber optic connector with the stub optical fiber extending along a termination axis and a camming member having a connector slot configured to be received over the cam member of the fiber optic connector. The camming member has a first position relative to the body in which the connector slot is spaced from the termination axis. However, the camming member is configured to translate relative to the body to move the connector slot over the termination axis such that the termination axis extends through the connector slot. The camming member is also configured to rotate relative to the body to change the orientation of the connector slot.

In other embodiments of this disclosure, the installation tools include a guide member and camming member, which together may form an actuation assembly. The guide member has a slot extending in an axial direction and is configured to receive a portion of the fiber optic connector. The camming member is positioned next to the guide member and is movable between a first position spaced from the slot and a second position axially aligned with the slot. Additionally, the camming member is configured to engage and actuate the cam member of the fiber optic connector by moving from the first position to the second position when the fiber optic connector is received in the slot.

Another embodiment of this disclosure relates to an installation tool for terminating one or more field optical fibers with a fiber optic connector, with the fiber optic connector including a cam member configured to securely position the one or more field optical fibers in the fiber optic connector upon actuation. The installation tool includes a body configured to support the fiber optic connector and an actuation assembly configured to receive a portion of the fiber optic connector. The actuation assembly includes a camming member movable relative to the body so as to be configured to actuate the cam member of the fiber optic connector when the fiber optic connector is supported by the body. The actuation assembly is also configured so that the fiber optic connector can be loaded into the actuation assembly prior to actuation along a first path of movement and unloaded from the actuation assembly after actuation along the first path of movement. The first path of movement may be substantially perpendicular to a termination axis defined when the body of the installation tool supports the fiber optic connector.

A system for terminating one or more field optical fibers is also disclosed. The system includes a fiber optic connector and installation tool like any of those mentioned above.

Additional features and advantages will be set forth in the detailed description which follows, and in part will be readily apparent to those skilled in the art from the description or recognized by practicing the embodiments as described in the written description and claims hereof, as well as the appended drawings.

Indeed, it is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of fiber optic connectors will appreciate how features and attributes associated with embodiments shown in one of the drawings may be applied to embodiments shown in others of the drawings.

DETAILED DESCRIPTION

Various embodiments will be further clarified by the following examples, which relate to installation tools for terminating one or more optical fibers with a fiber optic connector. The fiber optic connector may include one or more short, preterminated optical fibers ("optical fiber stubs") to which one or more optical fibers from the field ("field optical fibers") are optically coupled. To this end, the examples described below may be used in connection with the fiber optic connector 10 (FIGS. 1A and 1B). Reference can be made to the background section above for a complete description of the fiber optic connector 10, including how the cam member 20 is configured to the bias the splice components 17, 18 together to secure the field optical fiber 15 relative to the optical fiber stub 14 and thereby establish a mechanical splice connection. However, as noted in the background section, the examples disclosed herein may also be applicable to installation tools for other fiber optic connectors that are actuated to establish/secure a splice connection, including fiber optic connectors involving splices done in a factory rather than in the field and/or fiber optic connectors involving multiple fibers instead of single fibers. Therefore, any references to the fiber optic connector 10 below are merely to facilitate discussion.

Figure 6:
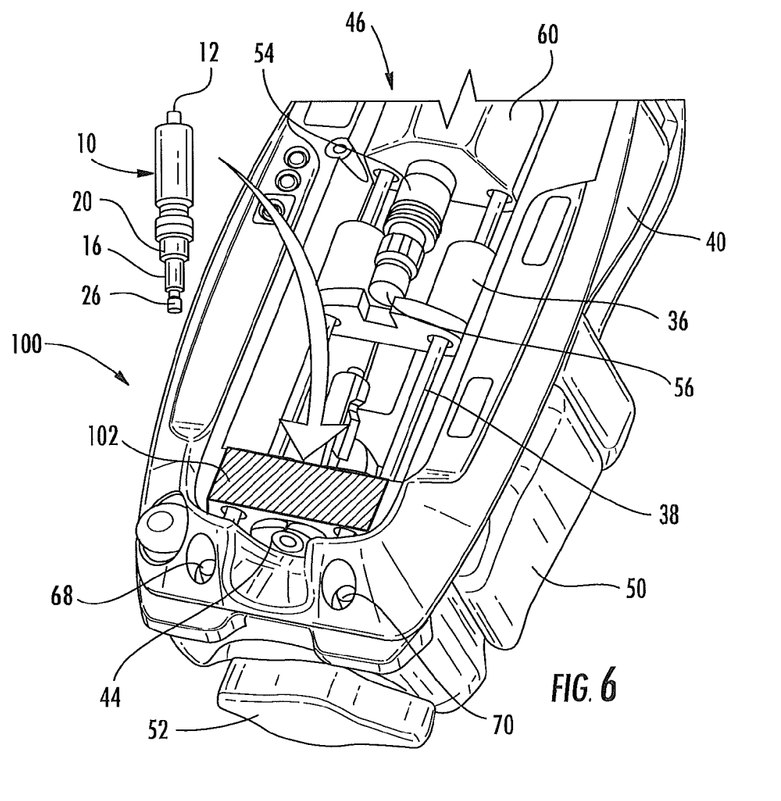
FIG. 6 is a perspective view of one example of an installation tool for terminating a field optical fiber with a fiber optic connector, wherein the installation tool includes an actuation assembly according to one embodiment of this disclosure.

Similar considerations apply with respect to aspects of the installation tools not related to actuating such fiber optic connectors. Indeed, the disclosure below focuses on actuation assemblies and/or camming members that may be used in many different configurations and arrangements of installation tools. As shown in FIG. 6, one embodiment may even be an installation tool 100 that is the same as the installation tool 30 (FIGS. 2-4) but for the actuation assembly 33 being replaced with an actuation assembly 102 according to this disclosure.

Figure 7:
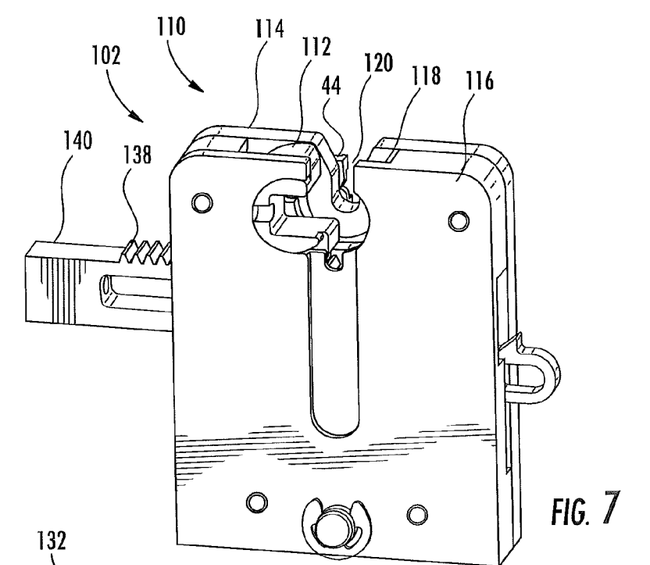
FIG. 7 is a perspective view of one embodiment of an actuation assembly according to this disclosure.

With this in mind, FIG. 7 illustrates one embodiment of the actuation assembly 102 in isolation. The actuation assembly 102 includes a guide member 110 and a camming member 112. In the embodiment shown, the guide member 110 includes opposed first and second walls 114, 116 and an interior space 118 defined between the first and second walls 114, 116. The first and second walls 114, 116 may be first and second plate-like members shaped to form the interior space 118 when bolted or otherwise secured together, for example. An axially-extending slot 120 is provided through an upper portion of the guide member 110 to accommodate insertion and removal of a fiber optic connector in a vertical direction. This ability to load and unload the fiber optic connector along the same path of movement (i.e., in a vertical direction) is also due to the camming member 112 being positioned within the interior space 118 of the actuation assembly 102 and interfacing with the guide manner 110 in a particular manner, as will be described in greater detail below.

Figure 8:
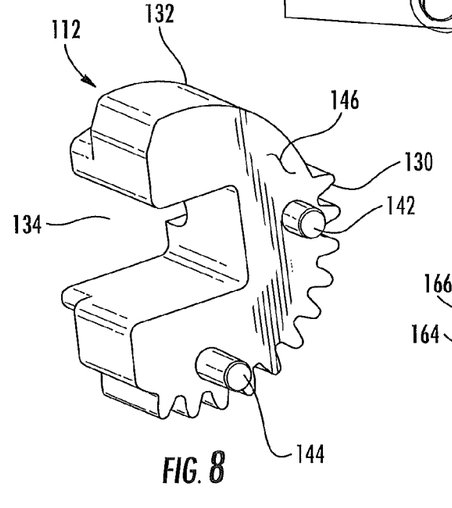
FIG. 8 is a perspective view of a camming member of the actuation assembly of FIG. 7.
Figure 9:
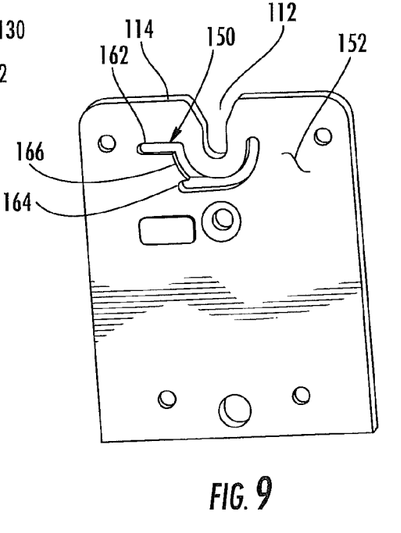
FIG. 9 is a perspective view of a portion of a guide member of the actuation assembly of FIG. 7.

In general, and with additional reference to FIGS. 8 and 9, the camming member 112 in this embodiment is in the form of a spur gear wrench. Accordingly, the camming member 112 has a substantially circular configuration with teeth 130 formed on a peripheral surface 132 and a connector slot 134 extending radially inward from the peripheral surface 132. The teeth 130 are configured to engage a rack gear 140, which itself is configured to translate relative to the body 32 (FIG. 6) of the installation tool 100 and guide member 110. The connector slot 134 is configured to be received over the cam member 20 of the fiber optic connector 10 during operation of the installation tool 100.

The camming member 112 also includes first and second projections 142, 144 extending from a side surface 146 that confronts the first wall 114 of the guide member 110. The first wall 114, on the other hand, includes a channel 150 formed on a guide surface 152 that confronts the side surface 146 of the camming member 112 for receiving the first and second projections 142, 144. The rack gear 140 is configured to effect movement of the camming member 112, and the channel 150 is configured to guide this movement. In particular, the channel 150 is configured to guide movement of the camming member 112 between a first position in which the camming member 112 is spaced from the slot 120 and a second position in which the camming member 112 is axially aligned with the slot 120. Interaction between the first and second projections 142, 144 and the channel 150 causes the camming member 112 to both translate and rotate when moving between the first and second positions. Again, the particular manner in which the camming member 112 interfaces with the guide member 110 will be described in greater detail below.

Figure 10:
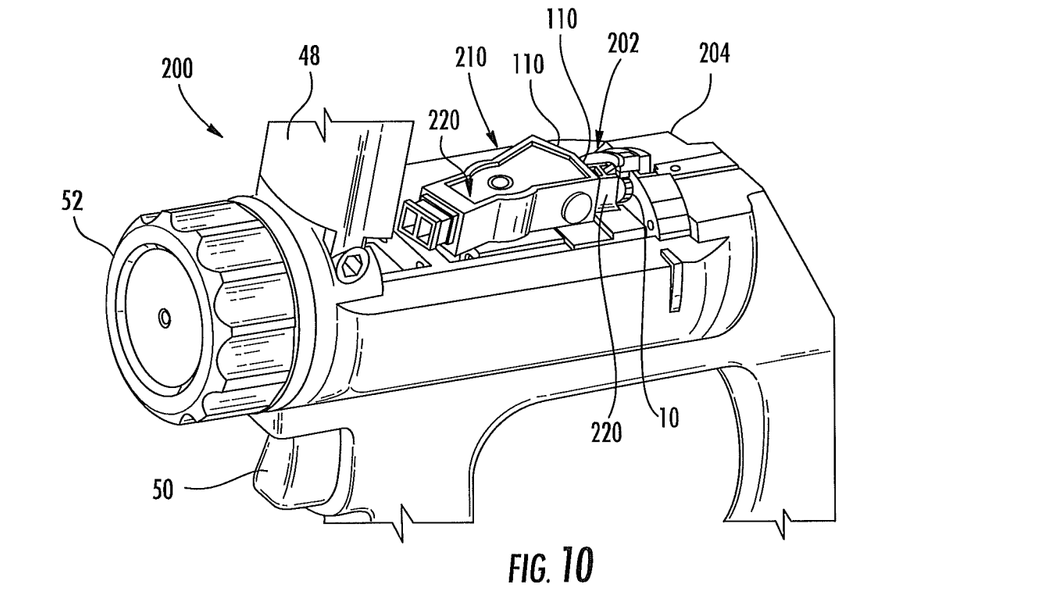
FIG. 10 is a perspective view of another example of an installation tool for terminating a field optical fiber with a fiber optic connector, wherein the installation tool includes an actuation assembly according to another embodiment of this disclosure.

FIG. 10 illustrates an installation tool 200 based upon the same or similar principles as the installation tools 30 (FIGS. 2-4) and 100 (FIG. 6), but having a different shape/configuration of components. For example, the installation tool 200 includes a body 204, an actuation assembly 202, and a test system 210 for checking the spice connection that the installation tool 200 eventually establishes between a fiber optic connector 10 and field optical fiber. To this end, the test system 210 serves the same purpose as the VFL assembly 46 in the installation tools 30 and 100. One difference is that the test system 210 includes an adapter 220 with different connector receiving areas for interfacing with different types of fiber optic connectors. The adapter 220 is movable relative to the body 204 to bring the appropriate connector receiving area 110 into alignment with the fiber optic connector 10 that has been loaded into the installation tool 200. A connector holder 222 may be used to facilitate positioning the fiber optic connector 10 and interfacing with the adapter 220. These and other aspects pertaining to the test system 210 are fully described in U.S. Provisional Patent Application No. 61/871,396, entitled "TEST SYSTEM FOR CHECKING A SPLICE CONNECTION BETWEEN A FIBER OPTIC CONNECTOR AND ONE OR MORE OPTICAL FIBERS" and filed on Aug. 29, 2013, which is herein incorporated by reference in its entirety.

Figure 11:
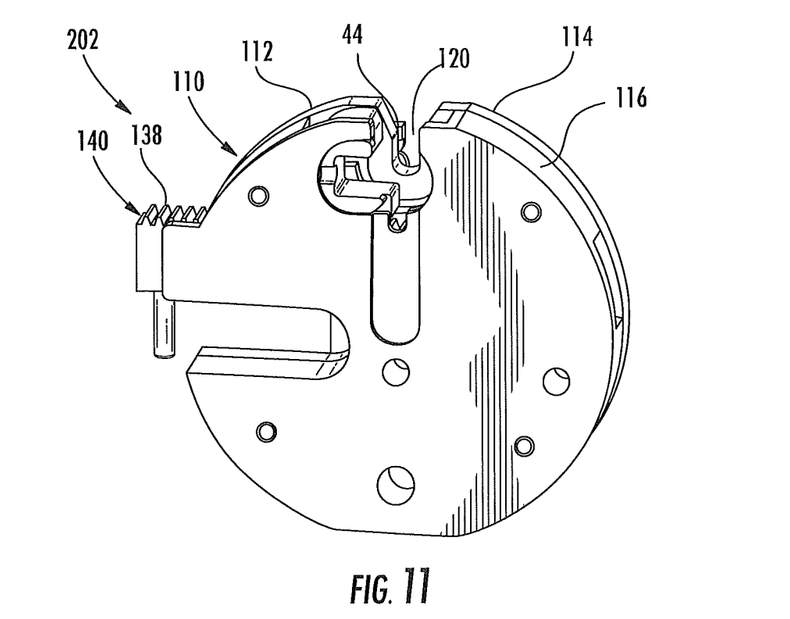
FIG. 11 is a perspective view of the actuation assembly of FIG. 10.
Figure 12:
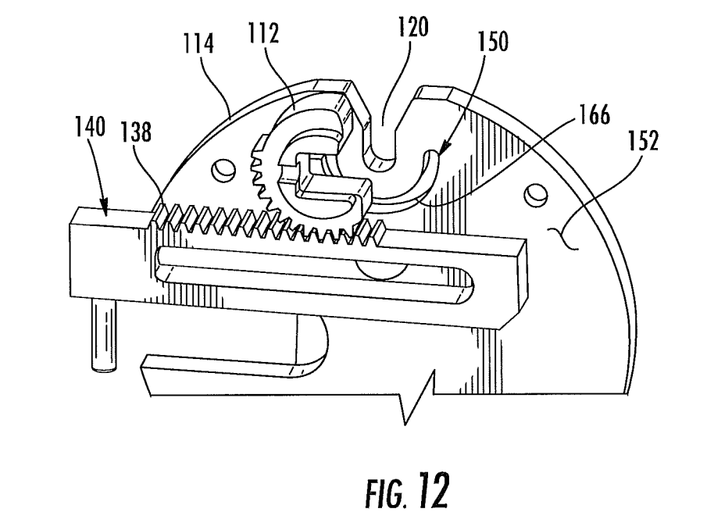
FIGS. 12-16 are perspective views sequentially illustrating movement of a camming member of the actuation assembly of FIG. 10 from a first position to a second position.
Figure 13:
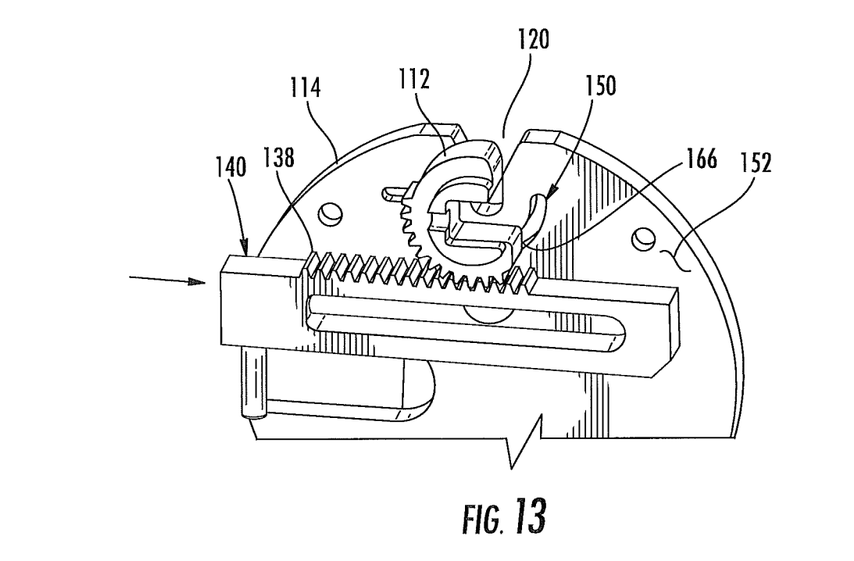

More pertinent to this disclosure is the actuation assembly 202, which is simply a different shape/configuration of the actuation assembly 102 (FIGS. 6-9) such that the same reference numbers are used to refer to corresponding elements. The same reference numbers are also used to refer to elements on the installation tool 200 that correspond to elements on the installation tools 30 and 100 relating to the operation of the actuation assembly 202. For example, with reference to FIGS. 10 and 11, the body 204 is configured to support the fiber optic connector 10 so that the cam member 20 (FIGS. 1A and 1B) is received in the camming member 112 of the actuation assembly 202. The lead-in tube 26 (hidden in FIG. 10) of the fiber optic connector 10 extends from the actuation assembly 202 and through the pair of crimp arms 44. After setting up the test system 210 in an appropriate manner based on the type of fiber optic connector being installed, a user inserts a field optical fiber 15 through the lead-in tube 26 and into the splice components 17, 18 (FIGS. 1A and 1B) of the fiber optic connector 10 so as to abut or nearly abut the end of the stub optical fiber 14. A cover 48 of the installation tool 200 is then closed over a workspace that includes the test system 210 and actuation assembly 202. Next, the cam button 50 may be pressed to cause the camming member 112 to actuate the cam member 20 of the fiber optic connector 10. The cam member 20 biases the splice components 17, 18 together upon actuation to secure the end portions of the stub optical fiber 14 and field optical fiber 15, thereby establishing the splice connection. The crimp arms 44 may then be actuated by rotating a crimp knob 52 or the like, at which point the cover 48 may be opened and the fiber optic connector 10 removed. Additional strain relieving to complete the cable assembly may then take place in a known manner.

The movement and positioning of the camming member 112 can be better understood with reference to FIGS. 12-16, which sequentially illustrate the camming member 112 moving from the first position (i.e., initial/start position) to the second position (i.e., actuated/final position). In the first position (FIG. 12), the camming member 112 is spaced from the slot 120 extending through the guide member 110. The arrangement is such that an unobstructed path is defined by the slot 120, allowing a user to move a fiber optic connector into the slot 120 from above (i.e., from a vertical direction). Stated differently, the connector slot 134 (FIG. 8) of the camming member 112 is spaced from a termination axis extending through the slot 120 in the guide member 110. The termination axis is the axis along which the stub optical fiber 14 extends when the fiber optic connector 10 is loaded in the installation tool 200 so as to be supported by the body 204.

In the first position, the first and second projections 142, 144 (FIG. 8) of the camming member 112 are received in respective first and second straight portions 162, 164 (FIG. 9) of the channel 150 in the guide surface 152. The first and second straight portions 162, 164 are parallel and interconnected by a semi-circular portion 166 of the channel 150 that intersects the first and second straight portions 162, 164. More specifically, as shown in FIG. 9, the channel 150 extends in a horizontal direction to define the first straight portion 162, then downwardly in an arcuate manner to define a first half of the semi-circular portion 166, and finally upwardly in an arcuate manner to define a second half of the arcuate portion 166. The second straight portion 164 is substantially tangent to the semi-circular portion 166, extending horizontally from where the first half of the semi-circular portion 166 transitions to the second half of the semi-circular portion 166. The second straight portion 164 and second half of the semi-circular portion 166 may have a greater depth compared to the first straight portion 162 and first half of the semi-circular portion 166 for reasons mentioned below. In the first position, the first and second projections 142, 144 of the camming member 112 are received in locations of the first and second straight portions 162, 164 that are spaced from the semi-circular portion 166. The first and second projections 142, 144 may have different lengths to match the different depths of the first and second straight portions 162, 164.

Movement of the camming member 112 may be effected by the rack gear 140 translating relative to the camming member 112. For example, the cam button 50 (FIG. 10) may be pressed inwardly relative to the body 204 of the installation tool 200 to actuate the rack gear 140 directly or indirectly (e.g., via mechanical linkages). Because the teeth 130 of the camming member 112 are engaged with teeth 138 on the rack gear 140, and because interaction between the first and second projections 142, 144 and first and second straight portions 162, 164 of the channel 150 constrain movement to a horizontal degree of freedom, the camming member 112 translates along with the rack gear 140. The translation continues until the first projection 142 reaches the end of the first straight portion 162 and the second projection 144 reaches the transition between the first and second halves of the semi-circular portion 166. At this point (FIG. 13), the camming member 112 is positioned so that the termination axis extends through the connector slot 134 (FIG. 8). Thus, when the fiber optic connector 10 has been loaded into the installation tool 200, the connector slot 134 is received over the cam member 20 at this point.

Figure 14:
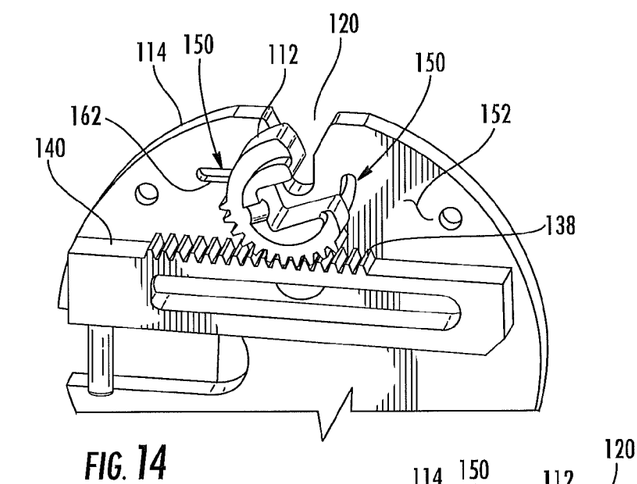
Figure 15:
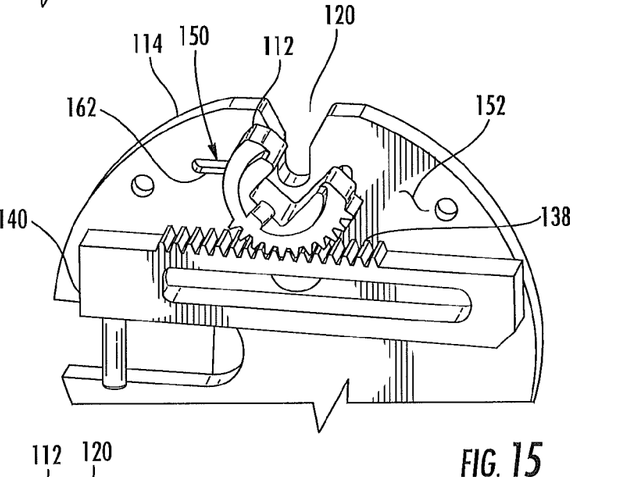
Figure 16:
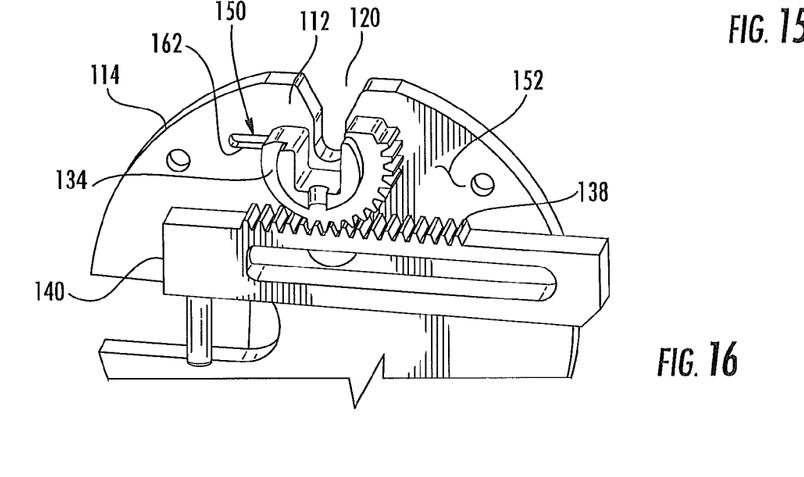

Although further horizontal movement of the camming member 112 is constrained due to the shape of the channel 150 (e.g., the first and second straight portions 162, 164 ending), a rotational degree of freedom is now provided by the semi-circular portion 166. Continued translation of the rack gear 140 rotates the camming member 112, including the connector slot 134, about the termination axis. FIGS. 14-16, illustrate various stages of this rotation. Ultimately the second projection 144 reaches an end of the semi-circular portion 166, which prevents further rotation and represents the second position (actuated/final position) of the camming member 112. By this time the connector slot 134 has rotated approximately 90 degrees, moving from a horizontal orientation to a vertical orientation. This movement actuates the cam member 20 when the fiber optic connector 10 has been loaded into the installation tool 200.

As shown in FIG. 16, the connector slot 134 faces up in the second position of the camming member 112. As was the case when the camming member 112 was in the first position, the arrangement is such that an unobstructed path is defined by the slot 120 through the guide member 110. Thus, a user can remove the fiber optic connector 10 from the actuation assembly 202 along the same path of movement (i.e., along a vertical direction) that was used to load the fiber optic connector 10 into the installation tool 200.

In some embodiments, the rack gear 140 may be biased towards the first position and configured to be locked in the second position. Therefore, whenever a user does not have the cam button 50 pressed, the camming member 112 is either in or moved to the first position or retained in the second position. Thus, the first and second positions effectively represent the only positions of the camming member 112 when the actuation steps (to actuating the cam member 20) are not actively being performed. In light of this, the unique configuration of the camming member 112, and the particular manner of movement, the actuation assembly 202 effectively has an "always open" pathway for loading and unloading a fiber optic connector. A user can easily load and unload a fiber optic connector from above, with a clear view of the workspace. The likelihood of incorrectly loading a fiber optic connector is reduced, which in turn reduces the likelihood of an unsuccessful termination and/or damage to the fiber optic connector during the termination process.

Note that when the camming member 112 moves back to the first position after actuation, the different lengths of the first and second projections 142, 144 help prevent binding/jamming. In particular, the second projection 144 may have a length greater than the depth of the first half of the semi-circular portion 166 and first straight portion 162. Such an arrangement helps ensure that the second projection 144 only moves along the path defined by the second half of the semi-circular portion 166 and the second straight portion 164, despite the first half of the semi-circular portion 166 intersecting the path.

Figure 17:
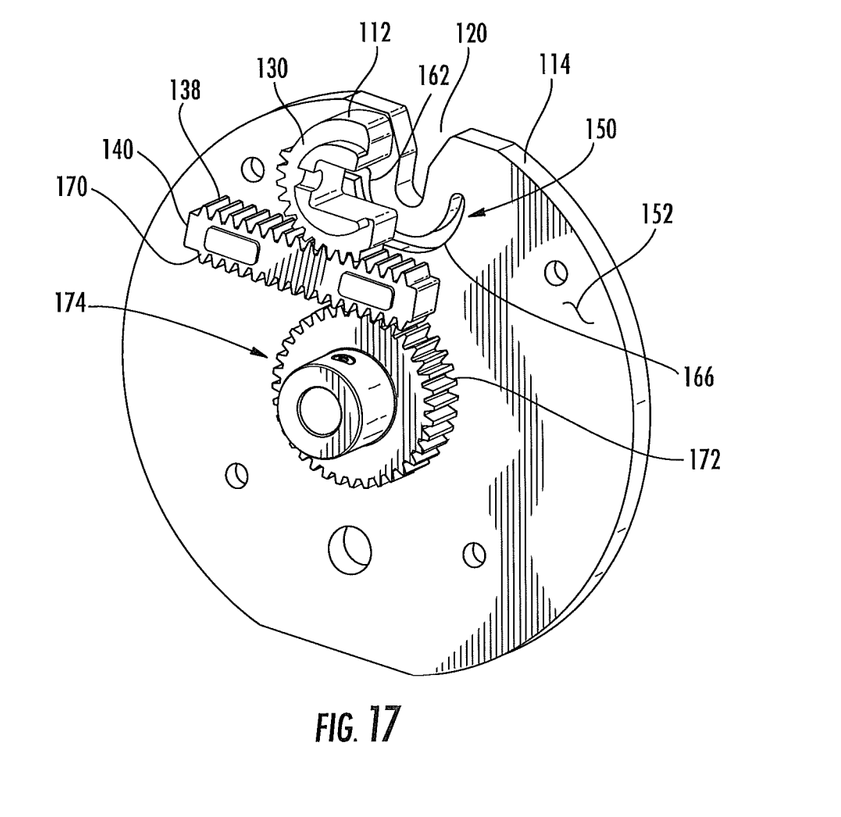
FIG. 17 is a perspective view of a portion of an actuation assembly according to an alternative embodiment.

In alternative embodiments, rather than the cam button 50 being used to move the rack gear 140, installation tools according to this disclosure may include a knob or other rotatable actuator to move the rack gear 140. FIG. 17 illustrates a portion of an actuation assembly 302 for such embodiments. As can be seen, the rack gear 140 may include teeth 170 on a bottom side for engaging teeth 172 of a spur gear or pinion 174. The spur gear 174 is operably coupled to the rotatable knob/actuator (not shown) by one or more shafts or other mechanical linkages. Thus, when a user rotates the knob, the spur gear 174 rotates to move the rack gear 140, which in turn moves the camming member 112 in the manner described above.

Note that by prov

Further embodiments, modifications, and variations within the scope of the claims below will be apparent to persons skilled in the art. For example, although the guide surface 152 (and channel 150) in the embodiments discussed above are formed on the first wall 114 of the guide member 110, in other embodiments the opposite wall of the guide member 110 (i.e., second wall 116; see FIG. 7) may define the guide surface 152 and channel 150. Alternatively, in some embodiments both the first and second walls 114, 116 may define guide surfaces having respective channels formed thereon for receiving projections on opposite sides of the camming member 112.

Since modifications, combinations, sub-combinations, and variations of the disclosed embodiments may occur to persons skilled in the art, the invention should be construed to include everything within the scope of the appended claims and their equivalents.

What is claimed is:

1. An installation tool for terminating one or more field optical fibers with a fiber optic connector, wherein the fiber optic connector includes one or more stub optical fibers extending from a ferrule into one or more splice components that are surrounded by a cam member, the installation tool comprising:
   a guide member having a slot extending in an axial direction and configured to receive a portion of the fiber optic connector; and
   a camming member positioned next to the guide member, wherein the camming member is movable in a horizontal direction between a first position spaced from the slot and a second position axially aligned with the slot, and further wherein the camming member is configured to engage the cam member of the fiber optic connector by moving in the horizontal direction from the first position to the second position when the fiber optic connector is received in the slot and actuate the cam member by rotating after moving in the horizontal direction.

2. The installation tool of claim 1, wherein the guide member includes a guide surface confronting the camming member and a channel formed on the guide surface, and further wherein at least a portion of the camming member is received in the channel on the guide surface, the channel being configured to guide movement of the camming member between the first and second positions.

3. The installation tool of claim 2, wherein the camming member includes first and second projections received in the channel at spaced apart locations.

4. The installation tool of claim 1, wherein the camming member includes a connector slot configured to receive the cam member of the fiber optic connector, wherein the connector slot has a horizontal orientation when the camming member is in the first position and a vertical orientation when the camming member is in the second position.

5. The installation tool of claim 1, wherein the camming member comprises a spur gear wrench, the installation tool further comprising:
a rack gear engaged with the spur gear wrench, wherein the camming member is configured to move between the first and second positions as a result of being driven by the rack gear and interacting with the guide member.

6. The installation tool of claim 5, further comprising:
a pinion gear engaged with the rack gear on an opposite side from the spur gear wrench.

7. The installation tool of claim 1, wherein the guide member has opposed first and second walls and an interior space defined between the first and second walls, the camming member being positioned in the interior space of the guide member.

8. The installation tool of claim 1, further comprising:
a body containing the camming member and guide member.

9. The installation tool of claim 8, further comprising:
an actuator configured to be pressed inwardly or rotated relative to the body, the actuator being operably coupled to the camming member to move the camming member between the first and second positions.

10. An installation tool for terminating one or more field optical fibers with a fiber optic connector, wherein the fiber optic connector includes a stub optical fiber extending from a ferrule into one or more splice components surrounded by a cam member, the installation tool comprising:
a body configured to support the fiber optic connector with the stub optical fiber extending along a termination axis; and
a camming member having a connector slot configured to be received over the cam member of the fiber optic connector, wherein the camming member has a first position relative to the body in which the connector slot is spaced from the termination axis, the camming member being configured to translate relative to the body to move the connector slot over the termination axis such that the termination axis extends through the connector slot, the camming member also being configured to rotate relative to the body to change the orientation of the connector slot.

11. The installation tool of claim 10, further comprising:
a guide member coupled to the body and interfacing with the camming member, wherein the guide member is configured to guide the translation and rotation of the camming member relative to the body.

12. The installation tool of claim 11, wherein the guide member includes a guide surface confronting the camming member and a channel formed on the guide surface, and further wherein at least a portion of the camming member is received in the channel on the guide surface, the channel being configured to guide the translation and rotation of the camming member relative to the body.

13. The installation tool of claim 12, wherein the channel includes first and second straight portions that are parallel and a semi-circular portion intersecting the first and second straight portions, and further wherein the camming member includes first and second projections received in the first and second straight portions, respectively, when the camming member is in the first position.

14. The installation tool of claim 10, wherein the camming member is configured to rotate so as to change the orientation of the connector slot by about 90 degrees.

15. The installation tool of claim 14, wherein the connector slot has a horizontal orientation when the camming member is in the first position and a vertical orientation when the camming member is in a second position.

16. A system for terminating one or more field optical fibers, comprising:
a fiber optic connector having a ferrule, two or more splice components proximate a rear end of the ferrule, a camming member surrounding the two or more splice components, and a stub optical fiber extending from the ferrule into the two or more splice components, the cam member being configured to bias the two or more splice components together upon actuation; and
an installation tool comprising:
a body configured to support the fiber optic connector with the stub optical fiber extending along a termination axis; and
an actuation assembly configured to receive a portion of the fiber optic connector, the actuation assembly including a camming member movable relative to the body so as to be configured to actuate the cam member of the fiber optic connector when the fiber optic connector is supported by the body, the camming member having a connector slot configured to be received over the cam member of the fiber optic connector;
wherein the camming member has a first position relative to the body in which the connector slot is spaced from the termination axis, the camming member being configured to translate in a horizontal direction relative to the body to move the connector slot over the termination axis such that the termination axis extends through the connector slot, the camming member also being configured to rotate relative to the body to change the orientation of the connector slot.

17. The system of claim 16, wherein the actuation assembly comprises:
a guide member having a slot extending in an axial direction and configured to receive a portion of the fiber optic connector;
wherein the guide member is positioned next to the camming member and configured to guide movement of the camming member.

18. An installation tool for terminating one or more field optical fibers with a fiber optic connector, wherein the fiber optic connector includes one or more stub optical fibers extending from a ferrule into one or more splice components that are surrounded by a cam member, the installation tool comprising:
- a guide member having a slot extending in an axial direction and configured to receive a portion of the fiber optic connector; and
- a camming member positioned next to the guide member; wherein:
  - the camming member is movable between a first position spaced from the slot and a second position axially aligned with the slot;
  - the camming member is configured to engage and actuate the cam member of the fiber optic connector by moving from the first position to the second position when the fiber optic connector is received in the slot;
  - the guide member includes a guide surface confronting the camming member and a channel formed on the guide surface;
  - the channel includes first and second straight portions that are parallel and a semi-circular portion intersecting the first and second straight portions;
  - the camming member includes first and second projections received in the respective first and second straight portions of the guide surface at spaced apart locations when the camming member is in the first position; and
  - the channel is configured to guide movement of the camming member between the first and second positions.

* * * * *